United States Patent [19]

Opprecht et al.

[11] Patent Number: 4,728,766

[45] Date of Patent: Mar. 1, 1988

[54] WELDING MACHINE FOR WELDING TONGUES ONTO SHEET-METAL PARTS

[75] Inventors: Paul Opprecht, Bergdietikon; Othmar Stieger, Kindhausen; Felix Kramer, Friedlisberg, all of Switzerland

[73] Assignee: Elpatronic AG, Switzerland

[21] Appl. No.: 840,440

[22] Filed: Mar. 17, 1986

[30] Foreign Application Priority Data

Mar. 18, 1985 [CH] Switzerland .................. 1183/85

[51] Int. Cl.⁴ .............................................. B23K 11/00
[52] U.S. Cl. ................................. 219/79; 219/86.24; 413/67
[58] Field of Search ............. 219/79, 78.01, 80, 86.24, 219/86.1, 86.7, 64, 67; 220/274; 413/12, 66–67

[56] References Cited

U.S. PATENT DOCUMENTS

| | | | |
|---|---|---|---|
| 1,308,778 | 7/1919 | Gravell | 219/83 |
| 1,884,683 | 10/1932 | Hermani | 220/274 X |
| 2,681,968 | 6/1954 | Renard | 219/80 |
| 3,144,955 | 8/1964 | Armstrong | 220/274 X |
| 4,214,944 | 7/1980 | Lemke | 220/274 X |
| 4,553,682 | 11/1985 | Tsurumara | 220/274 X |

*Primary Examiner*—E. A. Goldberg
*Assistant Examiner*—C. M. Sigda
*Attorney, Agent, or Firm*—McCormick, Paulding & Huber

[57] ABSTRACT

For welding tongues (12) onto sheet-metal parts (10), particularly tear-open can parts, a welding machine having at least one pair of welding electrodes (62, 63) is provided. The sheet-metal parts (10) can be moved through the machine in steps between the welding electrodes (62, 63), one behind the other, by a sheet-metal conveyor (15) and be located in a defined position by a positioning device (17). The tongues (12) can each be placed against a sheet-metal part (10) between the welding electrodes (62, 63) in synchronism with the working cycle of the sheet-metal conveyor (15) by a tongue conveyor (18).

19 Claims, 12 Drawing Figures

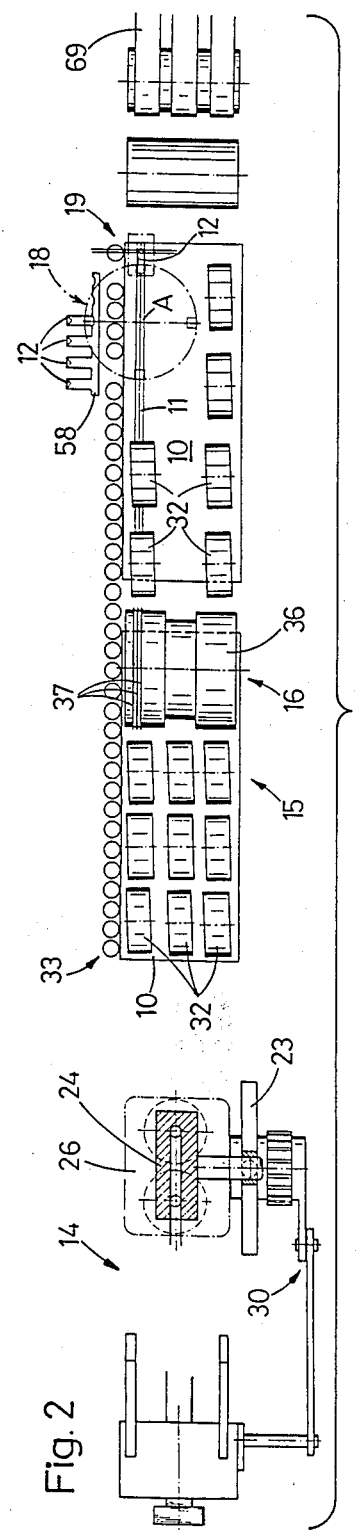

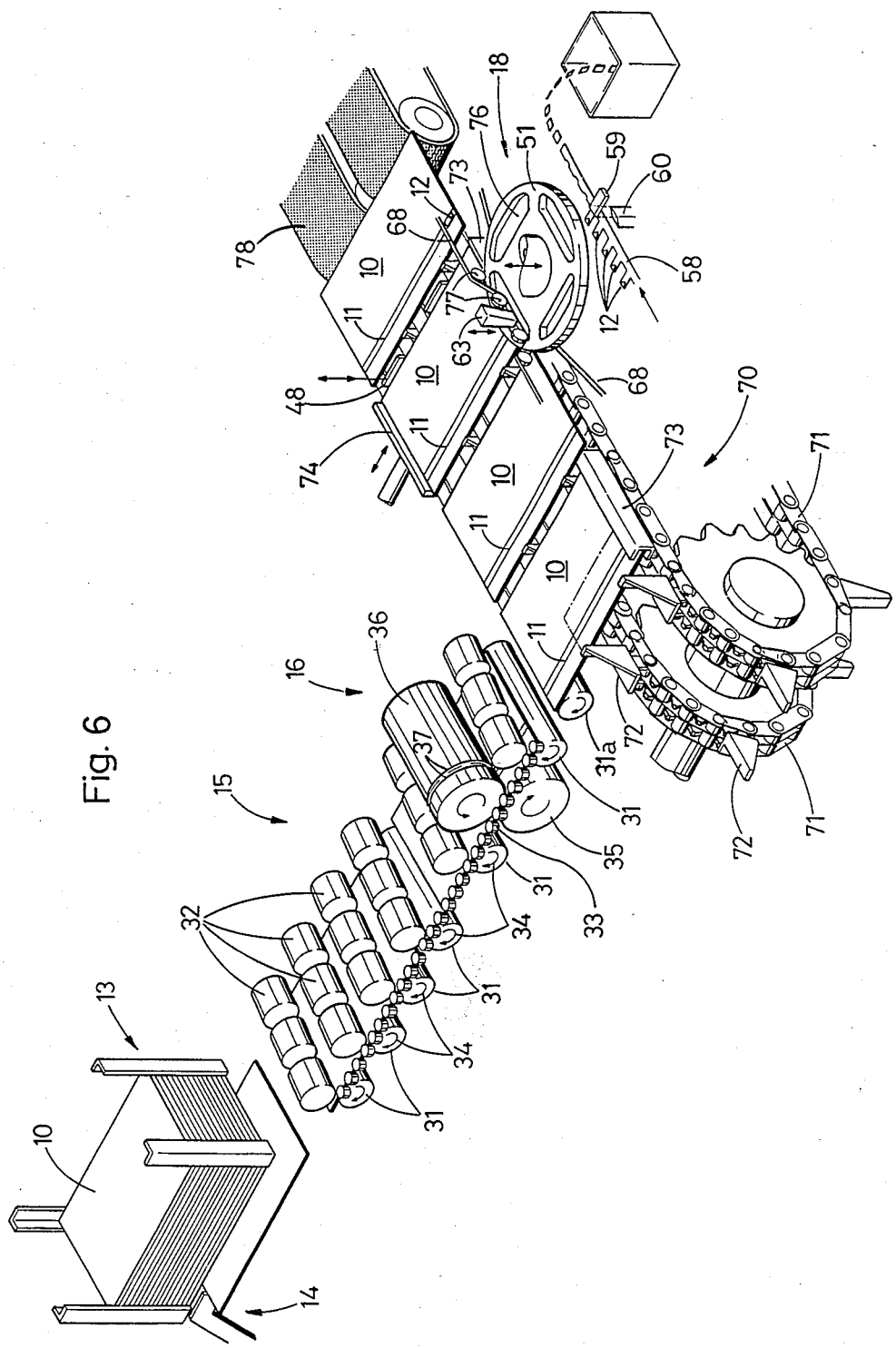

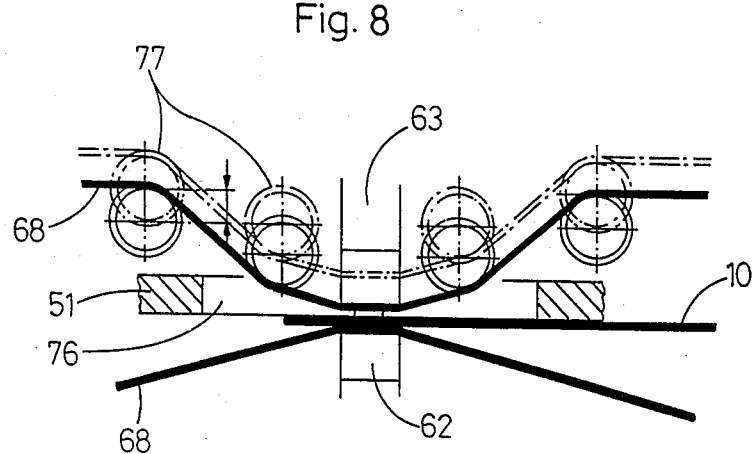
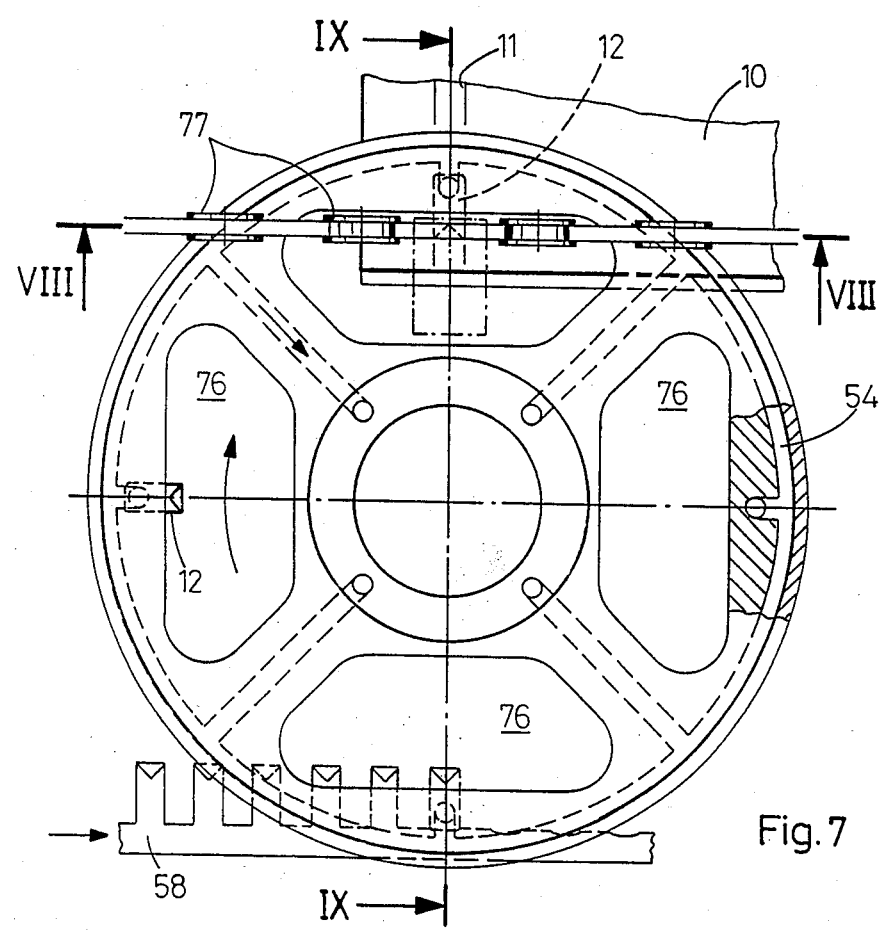

WELDING MACHINE FOR WELDING TONGUES ONTO SHEET-METAL PARTS

The invention relates to a welding machine having at least one pair of welding electrodes for welding tongues onto sheet-metal parts, particularly parts of tear-open cans, by an electrical resistance welding process.

Methods and apparatuses for welding tongues onto sheet-metal parts, particularly parts of tear-open cans, are the subject of earlier Patent Applications, which are not prior publications, of the applicants U.S. patent application Ser. No. 754,340 filed on July 11, 1985 and case U.S. patent application Ser. No. 779,885 filed on Sept. 25, 1985 in which it still remains unsettled as to how the sheet-metal parts and tongues should be prepared for the welding.

It is the object of the present invention to provide a welding machine of the type described at the beginning which is capable of welding tongues onto sheet-metal parts in short cycle times.

According to the invention, a welding machine which solves this problem is characterised by a sheet-metal conveyor whereby sheet-metal parts can be moved through the machine in steps one behind the other, between the welding electrodes, a positioning device whereby the sheet-metal parts can be located in a defined position between the welding electrodes, and a tongue conveyor whereby tongues can each be placed against a sheet-metal part between the welding electrodes in synchronism with the working cycle of the sheet-metal conveyor.

The welding machine according to the invention is preferably further developed in that the sheet-metal conveyor comprises a roller conveyor with lateral boundary means and a plurality of groups of rollers between which the sheet-metal parts can be moved through the machine one behind the other, the rollers bearing with initial compression against the top and bottom of the sheet-metal part and at least some rollers being disposed at an acute angle to the direction of movement of the sheet-metal part and pushing against the lateral boundary.

At the same time, an impressing roll may appropriately be disposed between two groups of rollers to impress at least two parallel weakening lines, defining a tear-off strip, in each sheet-metal part, and the positioning device is adjusted in such a manner that the tear-off strip comes between the welding electrodes.

The invention can be further developed in that a plurality of groups of rollers, between which the sheet-metal parts are disposed during the welding, are freely rotatable and that the positioning device comprises a pusher whereby the sheet-metal parts can be moved through the machine between the rollers of these groups into a welding position.

At the same time, the sheet-metal conveyor may comprise an additional reciprocable pusher whereby the sheet-metal parts can be advanced out of the welding position.

Alternatively or in addition to the above, the positioning device may comprise a stop which can be moved cyclically into the path of movement of the sheet-metal parts.

The sheet-metal conveyor may also comprise at least one transverse conveying track which can be moved cyclically and which extends transversely to the weakening lines. The transverse conveying track may comprise pusher dogs which come cyclically into alignment with the lateral boundary means of the roller conveyor.

At the same time, it is advantageous if a guide rail is disposed laterally adjacent the transverse conveying track, against which guide rail the sheet-metal parts can be moved with their leading edge disposed transversely to the weakening lines during the movement between the rollers.

With this development of the welding machine, it is further advantageous if a portion of the lateral guide rail extends in the vicinity of the welding electrodes and the positioning device is adapted to generate a force in the direction of the weakening lines, which force holds the sheet-metal part lying between the welding electrodes into contact with the said portion of the guide rail.

The tongue conveyor may comprise at least one receiver for a tongue, which receiver is movable out of the region of a punch for cutting the tongue off or removing the tongue from a sheet-metal strip into the region of the welding electrodes and back.

At the same time, the tongue conveyor may appropriately be rotatable stepwise about a central axis and comprise a plurality of receivers disposed radially round this axis with equal circumferential spacing, one for each tongue.

This form of embodiment can be further developed in that the receivers are bounded radially outwards by an edge of the tongue conveyor and open radially inwards into an aperture through which one of the welding electrodes can be moved in the direction of the other.

Each receiver may be connected to a suction conduit to draw in the removed tongue.

In a corresponding manner, the punch may comprise a suction cup to hold the removed tongue temporarily.

According to the said earlier Applications, the welding electrodes are movable in relation to one another in a pincer-like manner usual in spot welding. According to the invention, it is particularly appropriate if an electrode wire, which can be advanced in steps, is disposed between the welding electrodes movable thus and the sheet metal of the can or the tongue.

It is true that the use of electrode wire is known during the continuous longitudinal seam welding of can bodies (DE-C No. 1 017 042). In this case, an electrode wire, on which the electrode supports constantly roll, is passed between two overlapping marginal regions of a sheet-metal part rolled into a cylinder and each electrode support in the form of a roller. So far as can be seen, however, electrode wire has not hitherto been used for spot welding; this use according to the invention is extremely economical because satisfactory welding can be achieved in continuous operation of the welding machine according to the invention, without special measures, for example of the type proposed in the earlier mentioned application U.S. Ser. No. 779,885, if the electrode wire is moved on by a short step after the welding on of each tongue.

Finally, it is particularly advantageous if the positioning device has associated with it two pairs of welding electrodes as well as two tongue conveyors for welding one tongue onto each end of a common tear-off strip or onto one end of each of two tear-off strips. In this manner, the output capacity of the welding machine according to the invention can be doubled because the sheet-metal parts, each with two tongues welded on can then be divided transversely to the tearing strip or between two tear-off strips, parallel to these so that each sheet-metal part results in two can parts, each with a tongue, from each of which a round can body can subsequently be formed for example.

Examples of embodiment of the invention will be explained below, with further details, with reference to diagrammatic drawings.

Figure 1:
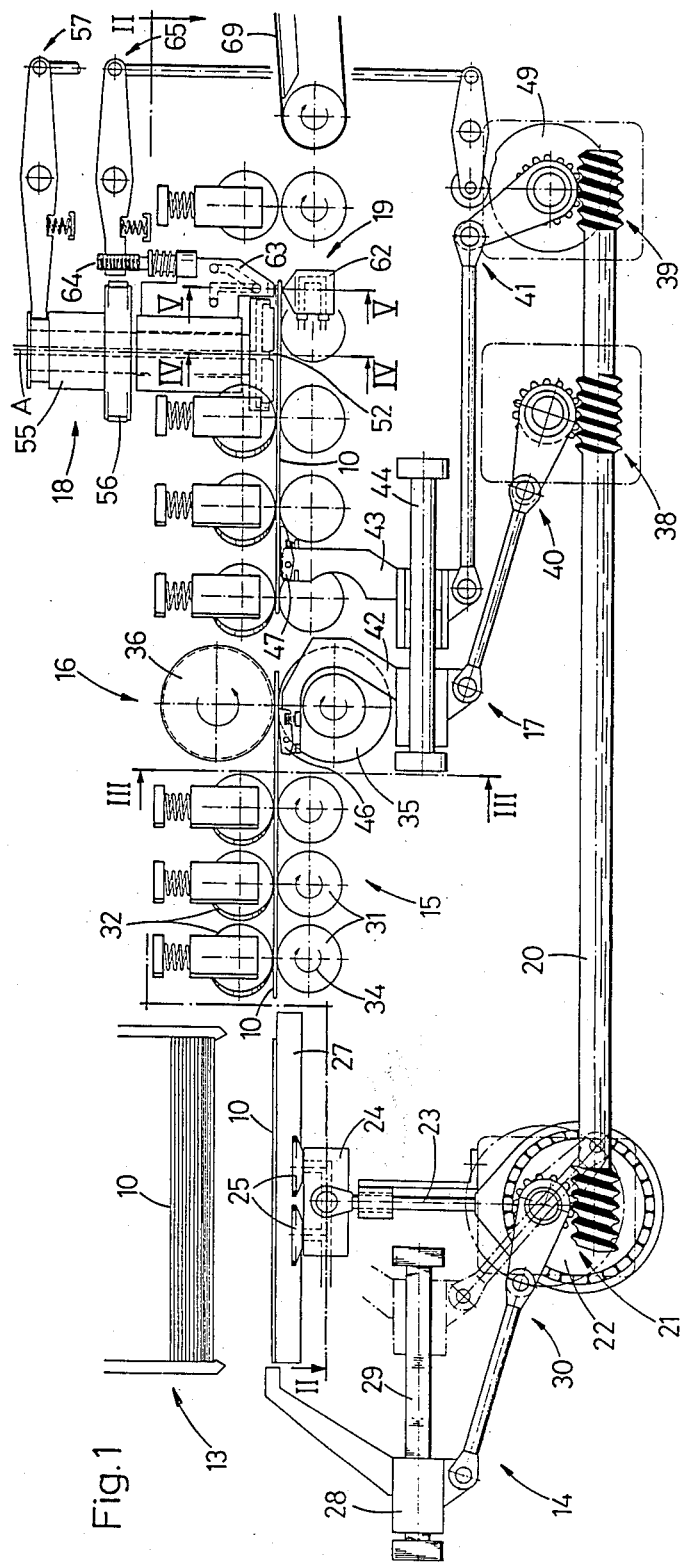
FIG. 1 shows a side view of a first welding machine according to the invention.
Figure 1A:
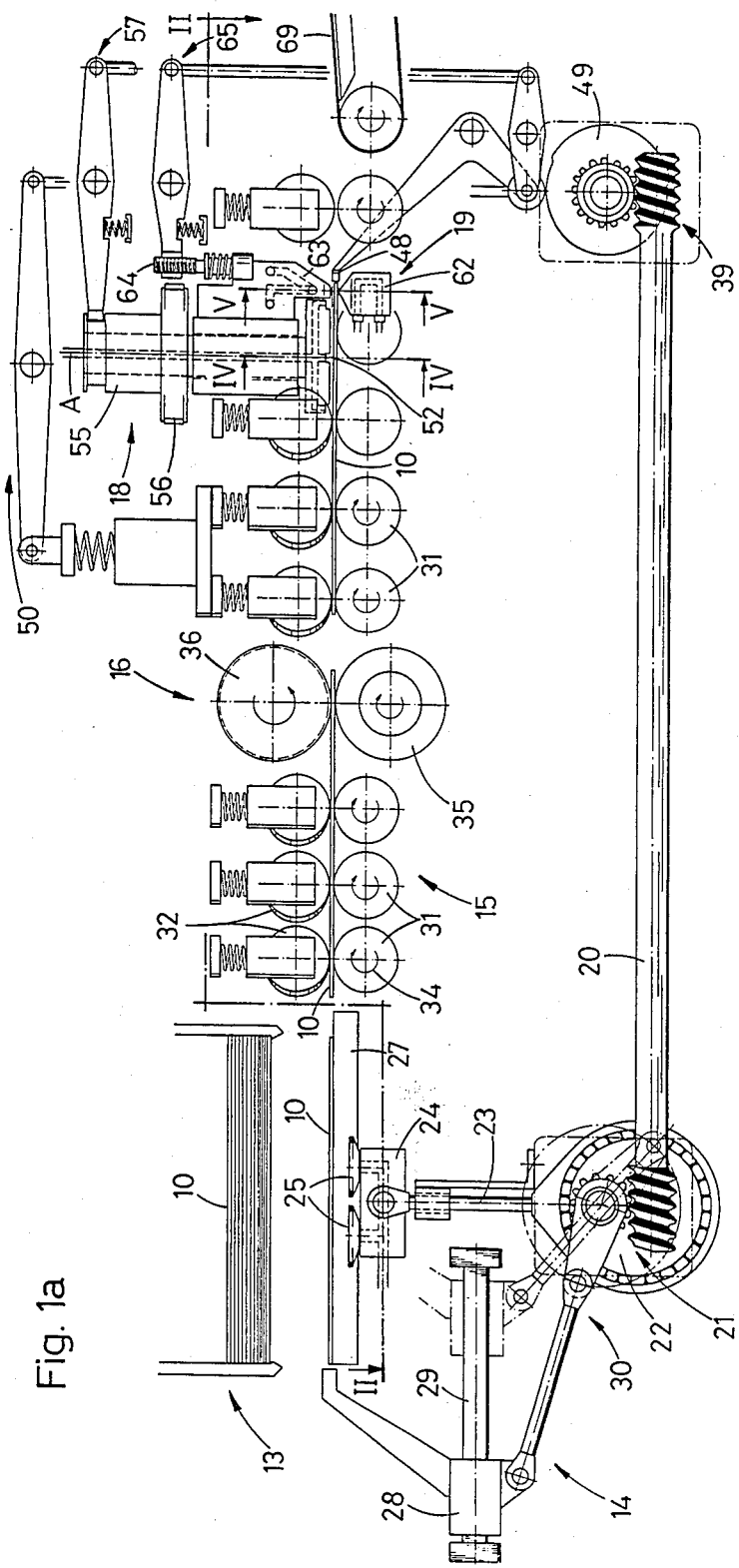
FIG. 1a shows a modification of FIG. 1.
Figure 3:
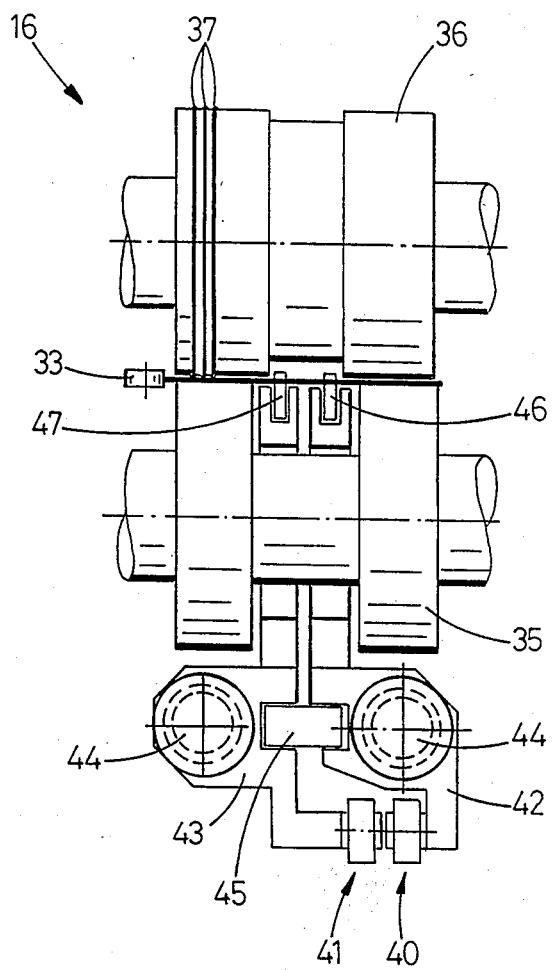
Figure 4:
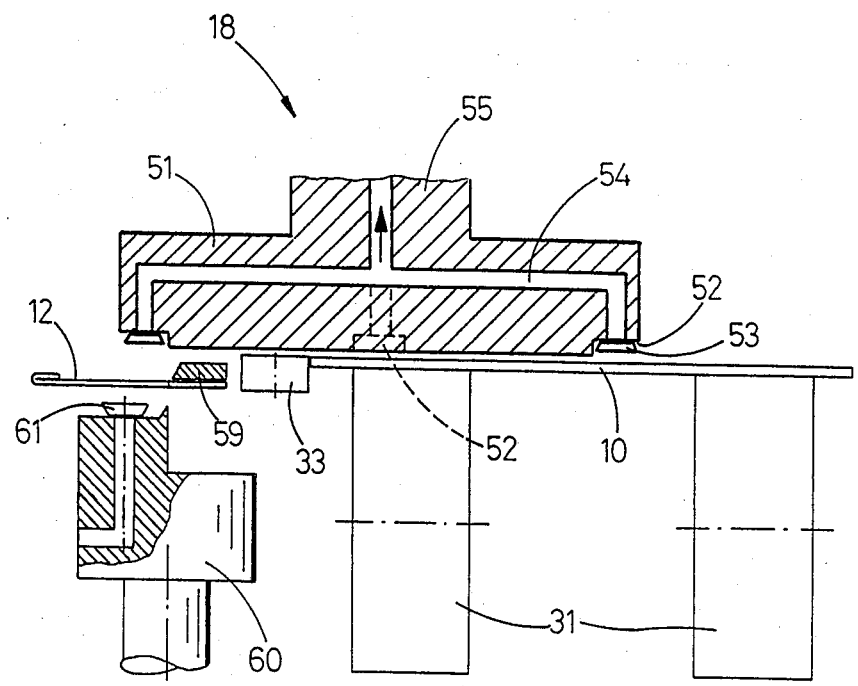
Figure 5:
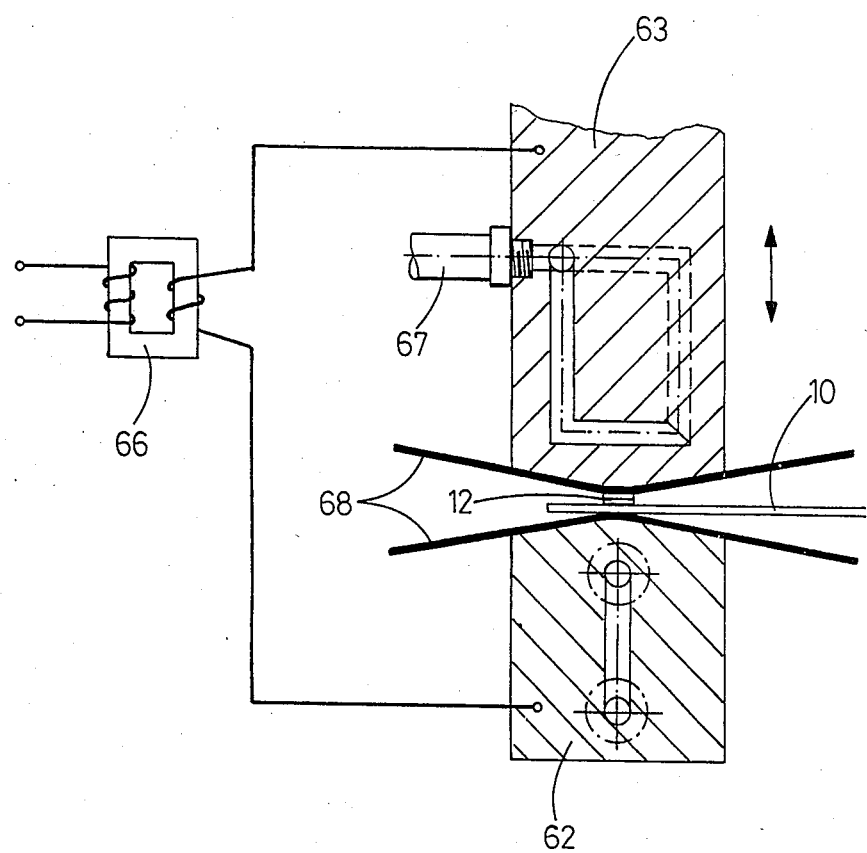
Figure 6A:
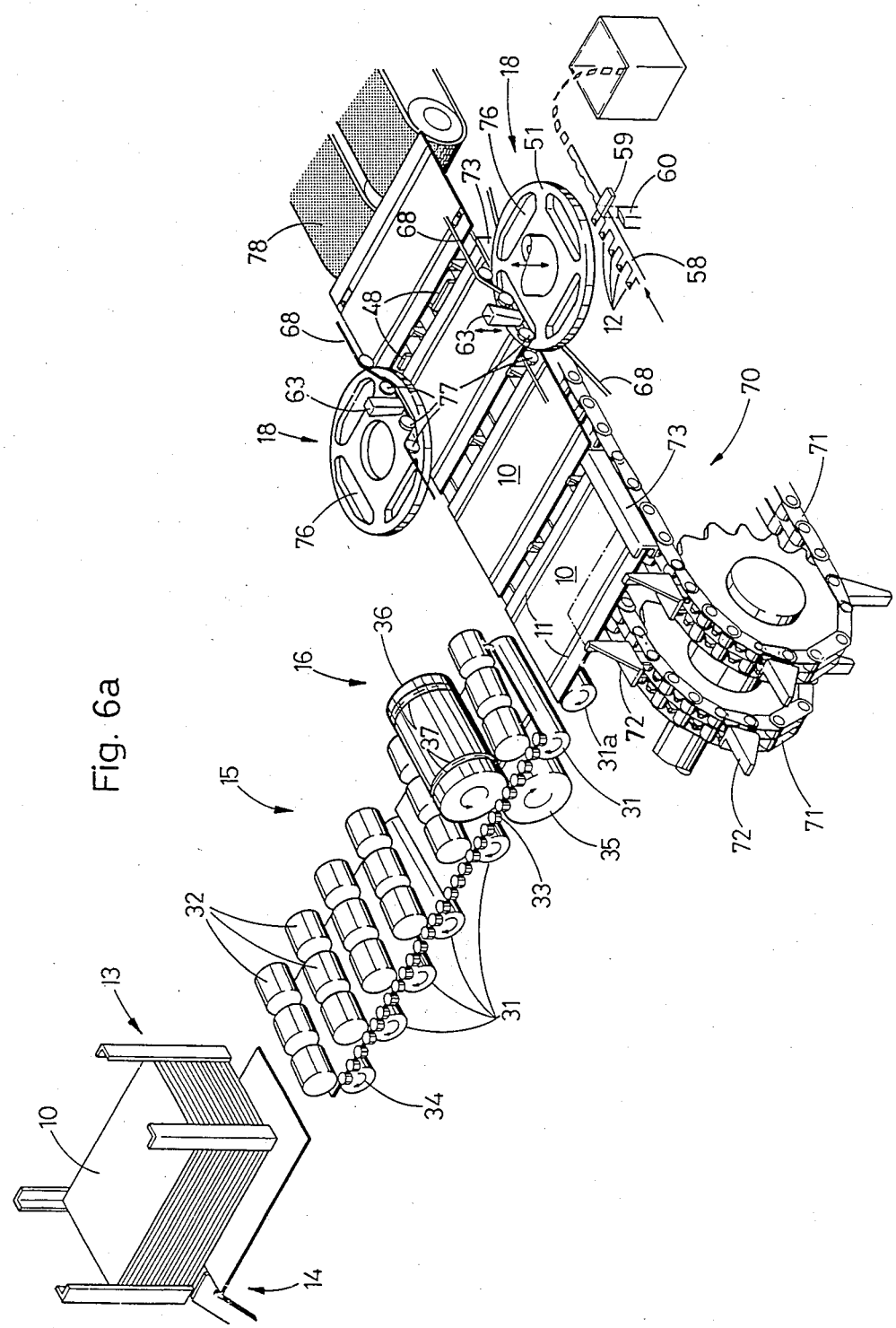
Figure 9:
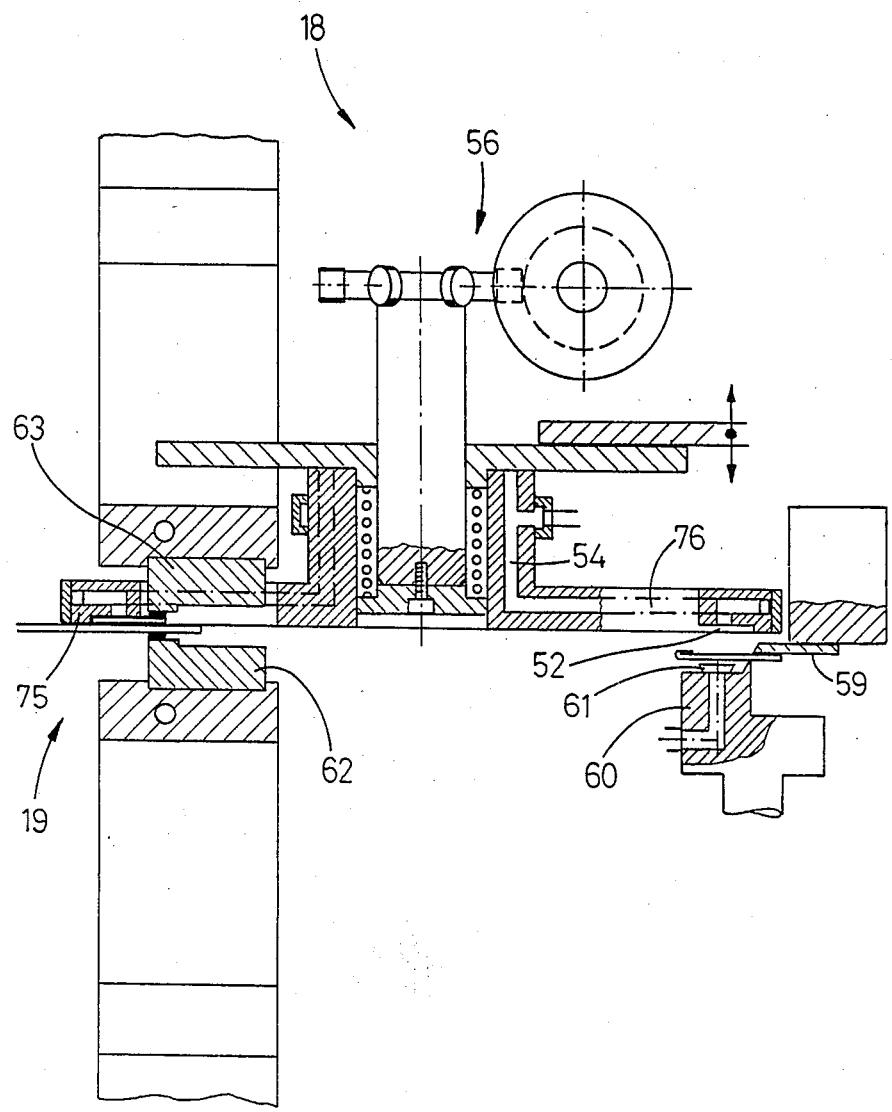
Figure 10:
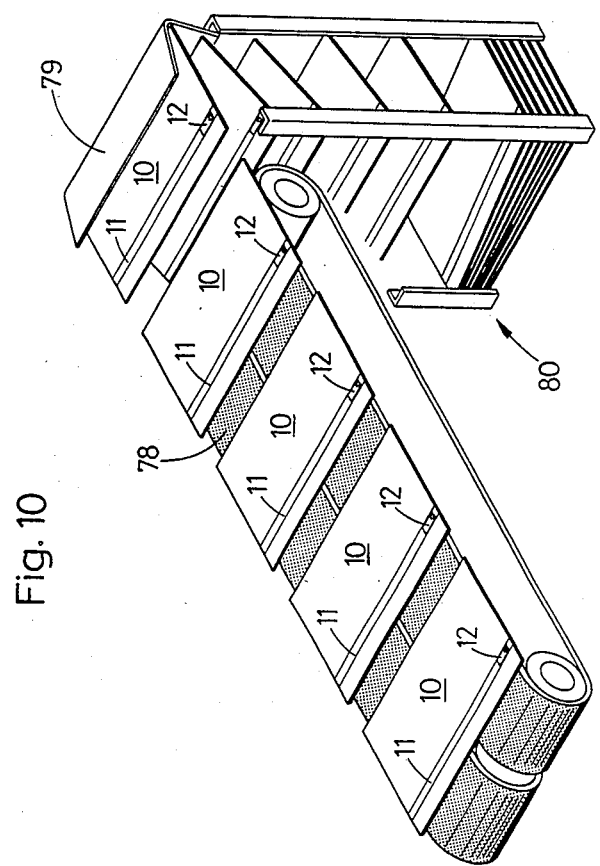

FIG. 2 shows the plan view belonging to FIG. 1 and FIG. 1a, partially as a horizontal section II—II in FIG. 1, FIG. 3 shows the vertical section III—III in FIG. 1, FIG. 4 shows the vertical section IV—IV in FIG. 1 and FIG. 1a, FIG. 5 shows the vertical section V—V in FIG. 1 and FIG. 1a, FIG. 6 shows a second welding machine according to the invention, in a perspective view obliquely from above, FIG. 6a shows a modification of FIG. 6, FIG. 7 shows a plan view belonging to FIG. 6 and FIG. 6a, FIG. 8 shows the vertical section VIII—VIII in FIG. 7, FIG. 9 shows the vertical section IX—IX in FIG. 7 and FIG. 10 shows an oblique view supplementing FIG. 6.

The welding machines illustrated have the job of providing rectangular sheet-metal parts 10 of tin plate for example 0.2 mm thick each with a tear-off strip 11 parallel to the longitudinal sides of the sheet-metal parts or with two such tear-off strips (FIG. 6a) and of welding a tongue 12 onto one end of each of these tear-off strips. Associated with each of the machines illustrated is a magazine 13 in which the sheet-metal parts 10 are kept stacked in readiness. Disposed below the magazine 13 is a destacker 14 and this is followed by a sheet-metal conveyor 15 which conveys the sheet-metal parts 10 further, in succession, in a horizontal plane. Associated with the sheet-metal conveyor 15 is an impressing station 16 for impressing the tear-off strips 11 and this is followed by a positioning device 17 which holds the sheet-metal parts successively in a precisely predetermined position in the working range of a tongue conveyor 18 and a welding station 19 or two tongue conveyors 18 and two welding stations 19 (FIG. 6a).

The said devices and subassemblies, which are present in each of the welding machines illustrated, are controlled by a common control shaft 20 which is partially illustrated in FIGS. 1 and 1a and can be driven by a motor not shown. A corresponding control shaft must also be imagined in the welding machine illustrated in FIG. 6 and its modification shown in FIG. 6a.

According to FIGS. 1 and 1a, the control shaft 20 is connected by a worm drive 21 to an eccentric 22 which belongs to the destacker 14 and on which a connecting rod 23 is mounted. The connecting rod 23 is articulately connected to a crosshead 24 which comprises two suction cups 25 on its top and is guided for upward and downward movement in an opening 26 in a table 27.

Towards the end of each upward stroke, the suction cups 25 attach themselves by suction to the bottom of the lowest sheet-metal part 10 held ready in the magazine 13, pull this sheet-metal part downwards out of the magazine during the next downward stroke and deposit it on the table 27.

In each of the machine illustrated, the destacker 14 further includes a fork-shaped pusher 28 which is guided on a horizontal rod 29 and can be reciprocated by the control shaft 20 through the worm drive 21 and a crank mechanism 30 in order to push the particular sheet-metal part 10 lying on the table 27 from the destacker 14 to the sheet-metal conveyor 15 on each working cycle.

The sheet-metal conveyor 15 comprises a plurality of groups of lower rollers 31 and upper rollers 32 each of which is rotatable about a horizontal axis. The axes of the lower rollers 31 extend at right angles to the longitudinal edges of the sheet-metal parts 10; the upper rollers 32 are disposed at a small skew angle to the lower rollers 31 and consequently tend to hold each sheet-metal part 10 travelling between the rollers 31 and 32 with one of its two longitudinal edges bearing against a lateral boundary 33. As indicated, the lateral boundary 33 is formed by a straight row of vertically mounted rollers.

The last lower roller 31a (FIGS. 6 and 6a) is a magnetic roll which is adjustable according to the length of the metal sheets.

The lower rollers 31 are fixedly supported; some of them—in FIG. 1, the first to the third lower rollers 31 and in FIG. 1a as well as FIGS. 6 and 6a additionally lower rollers 31 disposed further towards the right—can be driven in rotation by a motor not illustrated; each of these rollers is distinguished by an arrow 34. The upper rollers 32 are freely rotatable and resiliently supported vertically.

Mounted behind the third (FIGS. 1 and 1a) or fifth (FIGS. 6 and 6a) lower roller 31 which can be driven in rotation, parallel to these rollers, is a sturdy backing roll 35 and mounted above this, parallel to the upper rollers 32 is an impressing roll 36 which, according to FIGS. 1, 1a and 6, comprises a set of cutting edges consisting of three circular cutting edges 37 whereas according to FIG. 6a it comprises two sets of such cutting edges 37 which are each disposed close to one end of the impressing roll. Backing roll 35 and impressing roll 36 can be driven in rotation at a speed matching the circumferential speed of the lower rollers 31 and impress one or two (FIG. 6a) tear-off strips 11 in each sheet-metal part 10 travelling through between them, parallel to its longitudinal edges. Disposed on the control shaft 20, according to FIG. 1, are a second and a third worm drive 38 and 39 each of which drives a pusher 42 or 43 through a crank mechanism 40 or 41. The pushers 42 and 43 are each guided on a rod 44 parallel to the conveying direction of the sheet-metal conveyor 15 and on a common guide rail 45. Each of the pushers 42 and 43 carries a catch 46 or 47 which is initially tensioned resiliently upwards.

The pusher 42 belongs to the positioning device 17; during each working cycle of the welding machine, it engages its catch 46 behind a sheet-metal part 10 which has travelled through between backing roll 35 and impressing roll 36. The catch 46 pushes this sheet-metal part 10 into a precisely predetermined position in which its tear-off strip 11 is within working range of the welding station 19. The pusher 43, on the other hand, may be associated with the sheet-metal conveyor 15; its task is to convey the last-mentioned sheet-metal part 10 further, after the welding of a tongue 12, until it is entrained by a further driven lower roller 31.

The modification illustrated in FIG. 1a differs from FIG. 1 essentially in that the pushers 42 and 43 together with the associated drives and catches are omitted and the positioning device 17 comprises a stop 48 which can be moved into the path of movement of the sheet-metal parts 10 and which is controlled by the control shaft 20 through a camplate 49 and a lever arrangement. The first and second rollers 31 following on the backing roll 35 convey each sheet-metal part 10 provided with a tear-off strip 11 against the stop 48 in order to position it for the welding of a tongue 12. As soon as this sheet-metal part 10 has reached the stop 48, the upper rollers 32, which are associated with the last-mentioned driven lower rollers 31, are lifted by a lifting device 50, which is likewise controlled by the camplate 49, in order that the lower rollers 31, which continue to rotate, may not leave behind any traces on the sheet-metal part 10.

In the welding machine illustrated in FIGS. 1 to 5, including its modification shown in FIG. 1a, the tongue conveyor 18 includes a substantially horizontal, circular plate 51 which is rotatable step-by-step through 90° each time about a vertical axis A and at each circumferential distance likewise of 90° comprises a receiver 52, which is open downwards, for a tongue 12. The receivers 52 each contain a suction cup 53 which is connected to a suction conduit 54. The plate 51 is secured to a vertical shaft 55 which can be driven in rotation through a gear 56, likewise from the control shaft 20 and can be raised and lowered by a lifting device 57.

Guided along one secant of the circular plate 51 is a sheet-metal strip 58 on which tongues 12 are pre-punched, each at predetermined distances apart. The free end of each tongue 12 is folded back in the form of a triangle. In this connection, reference is made to the earlier mention patent application, Ser. No. 779,885) The sheet-metal strip 58 can be advanced step-by-step by a device not illustrated but likewise controlled by the control shaft 20 so that, during each working cycle of the welding machine, the foremost tongue 12, which is still connected to the sheet-metal strip, comes to lie under one of the receivers 52 in such a manner that, as shown in FIG. 2, this tongue extends radially in relation to the axis A and the folded-over end of this tongue lies outside the outer edge of the plate 51. The radially inner end of this tongue 12, which is still connected to the sheet-metal strip 58, lies between a die plate 59 and a punch 60 which is movable upwards and downwards and which severs the tongue from the sheet-metal strip 58 and holds it temporarily by means of a suction cup 61 secured to it until the tongue is lying safely in the associated receiver 52 and is held by the suction cup 53 disposed there. The tongue conveyor 18 is now turned through 90° about the axis A as a result of which the tongue 12 last severed enters the welding station 19.

In the welding station 19, two welding electrodes 62 and 63 are disposed vertically one above the other. The lower welding electrode 62 is stationary; the upper welding electrode 63 is suspended, through an adjustable threaded bolt 64, on a lifting device 65 and initially urged resiliently downwards in relation to this. The lifting device 65 is controlled through a lever bar by the camplate 49 or a corresponding control member likewise driven from the central control shaft 20.

The two welding electrodes 62 and 63 are connected to a welding transformer 66 in the manner usual in spot-welding machines, and connected to a coolant circuit 67. As detailed in FIG. 5, a portion of electrode wires 68 are positioned transverse across the tear-off strips 11, disposed adjacent to sheet metal part 10 and tongue 12 and between the upper and lower electrodes 63 and 62, respectively: The electrode wire 68 has a flattened, rectangular-like cross-section and is guided over guide rollers, not illustrated in FIGS. 1 to 5, and can be moved step-by-step.

During each working cycle of the welding machine, the upper welding electrode 63 executes a downward stroke, during which the secondary circuit of the welding transformer 66 is closed through the said two portions of the electrode wire 68 as well as the tongue 12 and the sheet-metal part 10, and the tongue 12 is welded to the tear-off strip 11 of the sheet-metal part 10 in question. Immediately after this, the tongue conveyor 18 executes an upward stroke so that it releases the welded-on tongue 12.

The welding machine shown in FIGS. 6 to 10, including its modification as shown in FIG. 6a, differs from that illustrated in FIGS. 1 to 5 firstly in that only two lower rollers, which are driven, and a set of upper rollers 32 are disposed beyond the backing roll 35 and the impressing roll 36. Extending behind these in a horizontal plane at right angles to the conveying direction of the sheet-metal conveyor 15 and hence also at right angles to the tear-off strips 11 is a transverse conveying track 70 which, in the example illustrated, comprises two parallel roller chains 71 and pusher dogs 72 disposed on these with spacing. The roller chains 71 can be driven step-by-step, likewise through the central control shaft 20, in such a manner that when they are at a standstill, one pair of pusher dogs 72 is substantially in alignment with the lateral boundary 33 of the sheet-metal conveyor 15 each time, while there is sufficient room between this and the preceding pair of pusher dogs 72 free to receive a sheet-metal part 10 delivered by the sheet-metal conveyor 15. This sheet-metal part is pushed, by the foremost driven lower roller 31a, against a lateral guide rail 73 which extends parallel to the transverse conveying track 70.

After two conveying steps of the roller chains 71, the last mentioned sheet-metal part 10 enters the welding station 19 in which this sheet-metal part bears with its narrow side adjacent to the observer in FIGS. 6 and 6a against an end portion of the guide rail 73. Associated with the opposite narrow side of the sheet-metal part 10 is a pusher 74 which ensures that bearing against the guide rail 73 is maintained and as a result the sheet-metal part is positioned in the longitudinal direction of the tear-off strip 11. The sheet-metal part 10 is positioned in the direction crosswise to the tear-off strip 11 as a result of the fact that a stop 48, similar to that illustrated in FIG. 1a, is moved upwards into an active position.

According to FIGS. 6 to 9, the tongue conveyor 18 is largely comparable to that illustrated in FIGS. 1 to 5; its plate 51 has, however, a circular outer rim 75 which projects downwards and which bounds the receivers 52 for the tongues 12 radially outwards. Here, the sheet-metal strip 58 is arranged in such a manner that each tongue positioned for cutting off is aligned with its folded-over end radially inwards. At the same time, the folded-over end of this tongue 12 lies below one of four apertures 76, one of which is associated with each of the receivers 52, and which are so large that the upper welding electrode 63, together with guide rollers 77 for the electrode wire 68 which can be raised and lowered jointly with t, can be moved through each of these apertures 76 without contact.

The portions of the electrode wire 68 running over the welding electrodes 62 and 63 again extend at right angles to the tear-off strip 11 and to the tongue 12 which is to be welded on. In contrast to FIGS. 1 to 5, the direction of these portions of the electrode wire 68 coincides with the direction in which the sheet-metal parts 10 are moved between the welding electrodes 62 and 63.

The modification shown in FIG. 6a differs from FIG. 6 in that—apart from the duplication of the cutting-edge arrangement on the impressing roll 36, already mentioned tongue conveyors 18 and welding stations 19 are disposed one at each side of the transverse conveying track 70 so that a tongue can be welded onto one end of each of the two tear-off strips 11 impressed by the impressing roll 36.

The welding machine shown in FIGS. 6 to 9, including its modification shown in FIG. 6a has a number of advantages in comparison with the welding machine illustrated in FIGS. 1 to 5:

Firstly, the welding machine is shorter, as FIGS. 6 and 6a clearly show.

Secondly, a faster method of work is possible because the tongues 12 are supported on the tongue conveyor 18 by its radially outer rim 75 and therefore cannot be displaced by centrifugal forces.

Thirdly, the overlapping between the tongue conveyor 18 and the sheet-metal part 10 situated in the welding station 19 is slight so that the tongue conveyor is more accessible for inspection and maintenance purposes. It is also observed thanks to this limited overlapping that the duplicated arrangement of tongue conveyors 18 and welding stations 19 illustrated in FIG. 6a is possible.

Fourthly, the coincidence between the conveying direction of the transverse conveying track 70 and the direction in which the electrode wire 68 runs over the welding electrodes 62 and 63 has the effect that the sheet-metal part 10 and the tongue 12 which have been welded together become detached easily from the electrode wire during the further movement without any protection against corrosion which may be present, particularly a coating of tin in the case of tin plate, being damaged.

Associated with each of the welding machines illustrated is a conveyor belt 69 in the machine of FIGS. 1 through 5, and conveyor belt 78 in the machine of FIGS. 6 through 10 for conveying away the sheet-metal parts 10 with welded-on tongues 12. The conveyor belt 78, which follows on the transverse conveying track 70 shown in FIG. 6, is illustrated in FIG. 10. Disposed behind the end of the conveyor belt 78 is an intercepting plate 79 which is bent at an angle and allows the sheet-metal parts 10 to fall into a stacking magazine 80.

If, as shown in FIG. 6a, the sheet-metal parts 10 have each been provided with two tear-off strips 11, onto each of which a tongue 12 has been welded, then these sheet-metal parts are divided centrally, parallel to the tear-off strips, in a following operation. There is also the possibility, however, of replacing the impressing roll 36 illustrated in FIG. 6a by that illustrated in FIG. 6 which only allows a single tear-off strip 11 to be formed on each sheet-metal part 10. In this case, two tongues 12 can be welded on, one at each end of the tear-off strip 11, if the tongue conveyors 18 and welding stations 19 illustrated in FIG. 6a, are disposed precisely diametrically opposite one another. The sheet-metal part 10 provided with two tongues 12 in this manner, is then divided into two parts transversely to the tear-off strip 11, each part comprising a tongue 12.

We claim:

1. A machine for use in welding pre-stamped tongues onto sheet metal parts by an electrical resistance welding process, comprising:
   a sheet metal conveyor adapted to receive and sequentially move the sheet-metal parts in a step-wise manner in a direction along a conveyor toward a welding position at a welding station, said conveyor including a plurality of opposed rollers through which pass the sheet metal parts;
   a means for impressing a plurality of weakening lines in the sheet metal parts in a direction substantially parallel to said conveyor direction, said weakening lines forming a tear off strip;
   a punch means sequentially receiving a plurality of pre-stamped tongues, said punch means for detaching a foremost one of said pre-stamped tongues; and
   a tongue conveyor means for receiving a pre-stamped punched tongue at a punch position and located said received tongue at said welding position registered between said sheet metal part weakening lines, further registered between welding electrodes, said welding position separated from said punch position.

2. The welding machine of claim 1 wherein at least some of said opposed rollers are freely rotatable and wherein said sheet metal conveyor further comprises a pusher (42) whereby the sheet-metal parts (10) can be moved between the rollers.

3. The welding machine as claimed in claim 2, wherein the sheet-metal conveyor further comprising an additional reciprocable pusher whereby the sheet-metal parts (10) can be moved on out of the welding position.

4. The welding machine as claimed in claim 1 wherein said sheet metal conveyor further comprises a stop (48) which can be moved cyclically into the path of movement of the sheet-metal parts (10).

5. A welding machine as claimed in claim 1 wherein the tongue conveyor means (18) is rotatable stepwise about a central axis (A) and comprises a plurality of receivers (52) disposed radially around this axis at equal circumferential distances apart, each receiver being adapted to receive one tongue (12).

6. A welding machine as claimed in claim 5, wherein the receivers (52) are bounded radially outwards by a rim (75) of the tongue conveyor (18) and open radially inwards into an aperture (76) through which one of the welding electrodes (62,63) can be moved in the direction of the other electrode.

7. A welding machine as claimed in claim 1 wherein said receiver (52) is connected to a suction conduit (54) to draw in the removed tongue (12) by suction.

8. A welding machine as claimed in claim 5, wherein the punch means (60) comprises a suction cup (61) to hold the removed tongue (12) temporarily.

9. A wleding machine as claimed in claim 1 wherein the welding electrodes (62,63) are movable in a pincer-like manner in relation to one another in a manner usual in spot welding, and wherein a cyclically movable electrode wire is disposed between the welding electrodes (62,63) and the sheet-metal part (10) and the tongue (12).

10. The machine of claim 1 where at least some of said opposed rollers are positioned at an acute angle to said conveyor direction for urging the sheet metal parts forward along said conveyor in contact with a lateral boundary positioned substantially parallel to the conveyor direction.

11. The machine of claim 1 wherein said tongue conveyor means moves said punched tongue along an arc between said punch position and said welding position.

12. The machine of claim 11 wherein said arc substantially comprises 180 degrees.

13. The machine of claim 11 wherein said sheet metal conveyor, further comprises a second conveyor section for receiving said impressed sheet metal parts for moving the received sheet metal parts along in a direction at an angle approximately 90 degrees to said conveyor direction.

14. The welding machine as claimed in claim 13 wherein said conveyor second section comprises pusher dogs (72) which come cyclically into alignment with a lateral boundary thereof.

15. A welding machine as claimed in claim 14, wherein said conveyor second section further comprises a lateral guide rail along which the sheet-metal parts (10) can be moved with their leading edge disposed transversely to the weakening lines (11).

16. A welding machine as claimed in claim 15 wherein one portion of the lateral guide rail (73) extends in the vicinity of the welding electrodes (62,63) and said conveyor second section is adapted to generate a force in the direction of the first plurality weakening lines (11) which force holds the sheet-metal part (10) lying between the welding electrodes (62,63) in contact with the guide rail (73).

17. The machine of claim 13 wherein said sheet metal conveyor comprises a second impressing means for impressing a second plurality of weakening lines in said sheet metal piece in a direction substantially parallel to said conveyor direction forming a second tear off strip.

18. A welding machine as claimed in claim 17 further comprising a second pair of welding electrodes (62,63) as well as a second tongue conveyor means (18) for welding one tongue onto one end of each of the tear-off strips (11).

19. The machine of claim 17 further comprising a second pair of welding electrodes and second tongue conveyor means configured for welding one tongue onto two ends of a common tear off strip.

* * * * *